US006658364B2

(12) United States Patent
Olin

(10) Patent No.: US 6,658,364 B2
(45) Date of Patent: Dec. 2, 2003

(54) METHOD OF ESTIMATING GAS PRESSURE IN AN ENGINE EXHAUST MANIFOLD

(75) Inventor: Peter M. Olin, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 140 days.

(21) Appl. No.: 10/143,967

(22) Filed: Dec. 13, 2001

(65) Prior Publication Data

US 2003/0004677 A1 Jan. 2, 2003

Related U.S. Application Data

(60) Provisional application No. 60/261,413, filed on Jan. 12, 2001.

(51) Int. Cl.[7] .......................... G06F 15/00; F02D 45/00

(52) U.S. Cl. ....................................... 702/140; 701/102

(58) Field of Search ............................ 702/140; 123/8; 701/8

(56) References Cited

U.S. PATENT DOCUMENTS

| | | | | | |
|---|---|---|---|---|---|
| 5,714,683 | A | * | 2/1998 | Maloney | 73/118.2 |
| 5,753,805 | A | * | 5/1998 | Maloney | 75/118.2 |
| 5,845,627 | A | * | 12/1998 | Olin et al. | 123/676 |
| 6,016,460 | A | * | 1/2000 | Olin et al. | 701/102 |
| 6,293,267 | B1 | * | 9/2001 | Smith et al. | 123/568.22 |
| 6,321,732 | B1 | * | 11/2001 | Kotwicki et al. | 123/568.16 |
| 6,366,847 | B1 | * | 4/2002 | Sun et al. | 701/103 |
| 6,430,515 | B1 | * | 8/2002 | Sanyal et al. | 702/50 |
| 6,459,985 | B1 | * | 10/2002 | Kotwicki et al. | 701/103 |

OTHER PUBLICATIONS

"Internal Combustion Engine Fundamentals", Heywood, McGraw–Hill, Inc., 1988.*

"Exhaust Manifold Pressure Estimation on a Turbocharged SI–Engine with Wastegate", Andersson et al., IFAC Advances in Automotive Control, Germany, 2001.*

* cited by examiner

*Primary Examiner*—John Barlow
*Assistant Examiner*—Toan M Le
(74) *Attorney, Agent, or Firm*—Jimmy L. Funke

(57) ABSTRACT

An improved method of estimating the gas pressure in the exhaust manifold of an internal combustion engine characterizes the engine exhaust system as a restriction, and estimates the exhaust manifold pressure as the gas pressure upstream of the restriction based on calibrated characteristics of the exhaust system and known characteristics of exhaust gas flow through the exhaust system. The estimation is based on a mathematical model that relates the mass flow of gas through the engine exhaust system to the exhaust manifold pressure (i.e., the upstream pressure), the barometric pressure (i.e., the downstream pressure) and the exhaust manifold gas temperature. An estimate of a pressure ratio across the exhaust system is calibrated based on the model parameters, and the exhaust manifold pressure is determined according to the product of the estimated pressure ratio and the barometric pressure.

2 Claims, 1 Drawing Sheet

METHOD OF ESTIMATING GAS PRESSURE IN AN ENGINE EXHAUST MANIFOLD

This application claims the benefit of Provisional Application No. 60/261,413, filed Jan, 12, 2001.

TECHNICAL FIELD

The present invention relates to a method estimating the gas pressure upstream or downstream of a complex restriction, and more particularly to a method of estimating the gas pressure in an engine exhaust manifold upstream of an engine exhaust system.

BACKGROUND OF THE INVENTION

An accurate indication of the gas pressure in the exhaust manifold of an internal combustion engine is required in order to accurately and reliably perform control and diagnostic functions, including fuel injection, Exhaust Gas Recirculation (EGR) valve control and Air Injection Reaction (AIR) control. Although the exhaust manifold gas pressure may be measured directly with a dedicated sensor, most automotive manufacturers have relied on an estimate of the pressure in order to save the cost of the sensor. For example, the pressure can be estimated using a variable adjustment or offset that is heuristically determined in relation to engine operating parameters, such as engine speed. However, the accuracy of the estimate tends to vary with operating conditions, particularly the variation in barometric pressure associated with altitude changes and the variation in the exhaust manifold gas temperature. Alternatively, the pressure can be estimated by iteratively solving a dynamic model of the engine combustion process. However this approach requires significant computational capability, and the accuracy of the estimated pressure tends to deteriorate when the exhaust manifold pressure is near barometric pressure. Accordingly, what is needed is an estimation method for use in production applications that is simple to implement and that provides a more accurate estimation of the exhaust manifold gas pressure.

SUMMARY OF THE INVENTION

The present invention is directed to an improved method of estimating the gas pressure in the exhaust manifold of an internal combustion engine by characterizing the engine exhaust system as a restriction, and estimating the exhaust manifold pressure as the gas pressure upstream of the restriction based on calibrated characteristics of the exhaust system and known characteristics of exhaust gas flow through the exhaust system. The estimation is based on a mathematical model that relates the mass flow of gas through the engine exhaust system to the exhaust manifold pressure (i.e., the upstream pressure), the barometric pressure (i.e., the downstream pressure) and the exhaust manifold gas temperature. An estimate of a pressure ratio across the exhaust system is calibrated based on the model parameters, and the exhaust manifold pressure is determined by applying the barometric pressure to the estimated pressure ratio. In a preferred embodiment, the mass flow of gas through the engine exhaust system is estimated using other engine gas flow estimates, including the inlet mass flow and the EGR valve mass flow. In a broader sense, the present invention provides a method of estimating the pressure upstream or downstream of a restriction passing a known mass air flow, given the mass air flow and its temperature, and one of the upstream or downstream pressures.

DESCRIPTION OF THE PREFERRED EMBODIMENT

Figure 1:
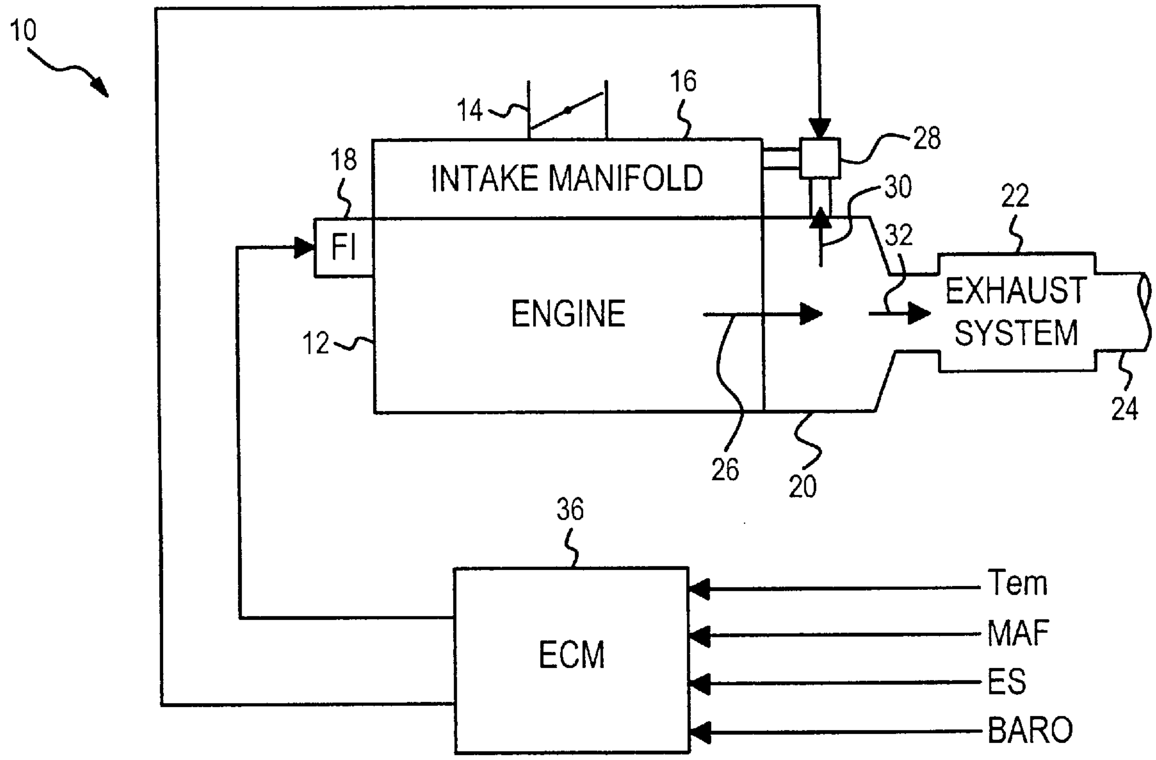
FIG. 1 is a diagram of an internal combustion engine and exhaust system and a microprocessor-based engine control module according to this invention.

Referring to FIG. 1, the present invention is disclosed in the context of a control system 10 for an internal combustion engine 12. The engine 12 includes a throttle valve 14 and intake manifold 16 through which intake air is ingested, a fuel injection (FI) system 18 for injecting a precisely controlled quantity of fuel for mixture with the intake air, an exhaust manifold 20 for collecting exhaust gasses after the air/fuel mixture is ignited, an exhaust system 22 coupled to the outlet of exhaust manifold 20, and a tailpipe 24 for releasing the exhaust system gas flow to atmospheric pressure. The exhaust gas entering exhaust manifold 20 is designated by the arrow 26, and a controlled portion of such gas is returned to intake manifold 16 via exhaust gas recirculation (EGR) valve 28, as designated by the arrow 30. The remaining exhaust gases, designated by the arrow 32, flow through the exhaust system 22, which typically includes a three-way catalytic converter, various connecting pipes, and a muffler.

As indicated in FIG. 1, the fuel injection system 18 and EGR valve 28 are controlled by a microprocessor-based engine control module (ECM) 36 in response to various inputs, which may be obtained with conventional sensors. Such inputs include, for example, intake manifold pressure (MAP), intake mass air flow (MAF) and engine speed (ES). Additionally, the barometric pressure (BARO) and the temperature (Tem) of the exhaust gases at the outlet of the exhaust manifold 20 can either be measured or estimated based on other parameters.

The present invention is directed to a method of operation carried out by ECM 36 for estimating the gas pressure in exhaust manifold 20 as a function of certain of the above-described parameters. Essentially, the engine exhaust system 22 is characterized as a restriction through which the gas flow 32 passes, with the exhaust manifold pressure considered as the gas pressure upstream of the restriction, and atmospheric pressure (BARO) being considered as the gas pressure downstream of the restriction. As such, the mass flow through the exhaust system MAFes may be algebraically described in terms of the effective area Aes of the exhaust system, the exhaust manifold pressure Pem, the barometric pressure Pbaro, and the exhaust manifold gas temperature Tem as follows:

$$MAFes=[Aes*Pem/(R*Tem)^{1/2}]*f(Pbaro/Pem) \quad (1)$$

where R is a gas constant and “f” is a function representing the effect of the pressure ratio (Pbaro/Pem) on the flow through a restriction (i.e., the exhaust system 22). The exhaust system flow MAFes, in turn, can be estimated as the engine exhaust port flow MAFep, less the EGR flow MAFegr, both of which may be reliably estimated based on inputs such as MAP, MAF and the EGR flow estimated by ECM 36. In other applications, the engine 12 may be equipped with additional air control devices such as vapor purge and air injection reaction (AIR), and such flows obviously have to be taken into account in estimating MAFep.

By re-arranging the terms in equation (1), it is possible to isolate the exhaust manifold pressure Pem to a single term using a calibratable function “g” as follows:

$$MAFes=[Aem*Pbaro/(R*Tem)^{1/2}]*g(Pem/Pbaro) \quad (2)$$

Then equation (2) may be solved for the pressure ratio (Pem/Pbaro) across exhaust system 22 as follows:

$$(Pem/Pbaro)=h[(MAFes*(R*Tem)^{1/2})/(Aes*Pbaro)] \quad (3)$$

or simply:

$$(Pem/Pbaro)=h[(B)], \text{ where} \quad (4)$$

$$B=[(MAFes*(R*Tem)^{1/2})/(Aes*Pbaro)] \quad (5)$$

and "h" is a calibratable function of the input quantity B. In practice, it is preferable to normalize the quantity B to make the implementation application independent (i.e., independent of engine size). This can be easily achieved by applying a normalization constant Knorm to the denominator of B, as follows:

$$Bnorm=[(MAFes*(R*Tem)^{1/2})/(Aes*Pbaro*Knorm)] \quad (6)$$

where Bnorm is the normalized input to function "h", and Knorm is defined, for example, as the product (Bmax*1.1), where Bmax is the highest expected input value for any engine under consideration. The value of Bmax, of course, may be identified by engine data collection over the entire engine operating range. Also, the term Aem itself is a calibrated value (either a constant, or a calibrated function of engine operating parameters, such as exhaust system flow MAFes), and may be combined with the normalization constant Knorm to form a single constant, if desired.

Finally, the exhaust manifold pressure Pem may be computed as:

$$Pem=Pbaro*h[(B)] \quad (7)$$

Figure 2:
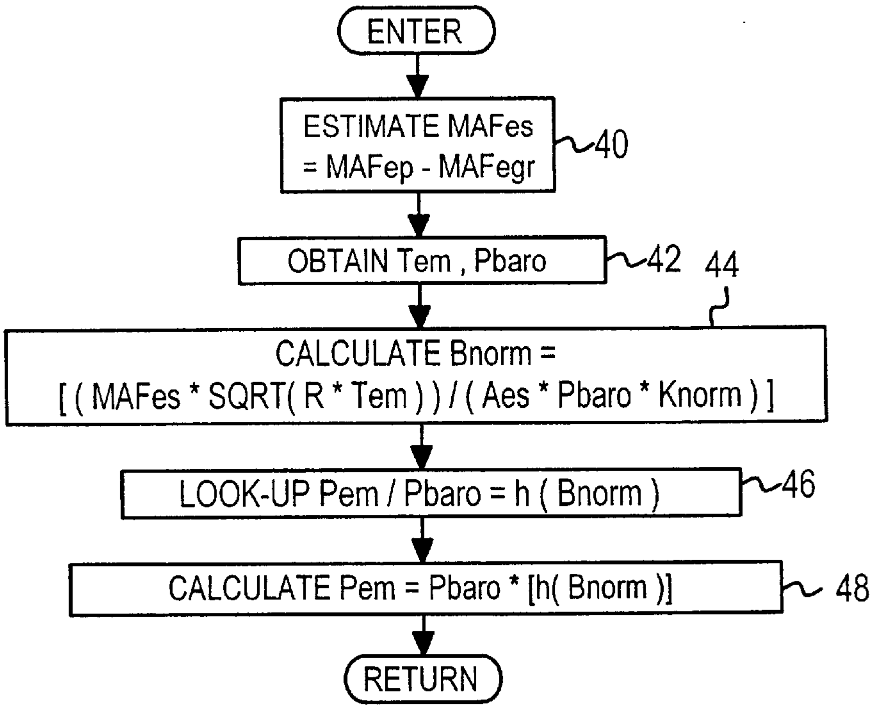
FIG. 2 is a block diagram representative of a software routine executed by the engine control module of FIG. 1 in carrying out the method of this invention.

The flow diagram of FIG. 2 illustrates an implementation of the above-described method for the system 10 of FIG. 1. As such, the flow diagram of FIG. 2 may be considered to represent a software routine periodically executed by ECM 36 in the course of engine operation. The block 40 estimates the exhaust system mass flow MAFes as the difference (MAFep−MAFegr), the block 42 obtains current values of Tem and Pbaro, and the block 44 computes Bnorm according to equation (6) based on MAFes, Tem and Pbaro. The block 46 represents a table look-up function (i.e., the function "h" of equations 3 and 4) in which a table containing empirically determined data representative of the pressure ratio Pem/Pbaro for various values of Bnorm is addressed based on the value of Bnorm computed at block 44. Finally, the block 48 computes the exhaust manifold pressure Pem according to equation (7).

In the broadest sense, the method of this invention can be used to find the upstream or downstream pressure for any restriction. That is, the exhaust manifold and atmospheric pressure values Pem, Pbaro in equation (1) above may be considered generically as upstream and downstream pressures Pup, Pdown. On one hand, Pup can be determined as a function of Pdown, Tin, Aeff and MAFres as described above, where Tin is the temperature of the gas entering the restriction, Aeff is the effective area of the restriction, and MAFres is the mass air flow through the restriction. On the other hand, if Pdown is known, Pup can be determined by rearranging equation (1) to isolate Pup in the pressure ratio Pup/Pdown, and solving for Pup/Pdown; in this case, Pup is given by the product [Pdown*(Pup/Pdown)].

In summary, the present invention provides an easily implemented and reliable estimate of the pressure in the exhaust manifold of an internal combustion engine by characterizing the engine exhaust system as a restriction, and estimating the exhaust manifold pressure as the gas pressure upstream of the restriction based on calibrated characteristics of the exhaust system and known characteristics (temperature and downstream pressure) of exhaust gas flow through the exhaust system. While the invention has been described in reference to the illustrated embodiment, it is expected that various modifications in addition to those mentioned above will occur to those skilled in the art. For example, the various input values to ECM 36 may be estimated instead of measured, and so on. Thus, it will be understood that methods incorporating these and other modifications may fall within the scope of this invention, which is defined by the appended claims.

What is claimed is:

1. A method of estimating gas pressure in an exhaust manifold of an internal combustion engine, where gases in the exhaust manifold are released to the atmosphere through an exhaust system coupled to the exhaust manifold, the method comprising the steps of:

empirically determining and storing ratios of atmospheric gas pressure and exhaust manifold gas pressure corresponding various values of the quantity $[(MAFes*(R*Tem)^{1/2})/(Aes*Pbaro)]$, where MAFes is a mass air flow of gas through said exhaust system, R is a gas constant, Tem is a temperature of gas in said exhaust system, Aes is an effective area of said exhaust system, and Pbaro is an atmospheric pressure;

computing a value of $[(MAFes*(R*Tem)^{1/2})/(Aes*Pbaro)]$ during operation of said engine, based on operational values of MAFes, Tem and Pbaro;

retrieving an empirically determined and stored ratio of atmospheric gas pressure and exhaust manifold gas pressure corresponding to said computed value; and estimating the gas pressure in the exhaust manifold by applying the operational value of Pbaro to the retrieved ratio.

2. A method of estimating gas pressure in an exhaust manifold of an internal combustion engine, where gases in the exhaust manifold are released to the atmosphere through an exhaust system coupled to the exhaust manifold, the method comprising the steps of:

mathematically defining a pressure ratio across the exhaust system as a function of a mass flow of gas through the exhaust system, a temperature of the gas flowing through the exhaust system, and an atmospheric pressure;

empirically determining and storing pressure ratios corresponding to various values of said function;

during subsequent operation of said engine, measuring or estimating values of the mass flow of gas through the exhaust system, the temperature of the gas flowing through the exhaust system, and the atmospheric pressure, and computing a value of said function based on said values;

retrieving an empirically determined and stored pressure ratio corresponding to the computed value of said function; and estimating the gas pressure in the exhaust manifold by applying the measured or estimated value of atmospheric pressure to the retrieved pressure ratio.

* * * * *